UNITED STATES PATENT OFFICE.

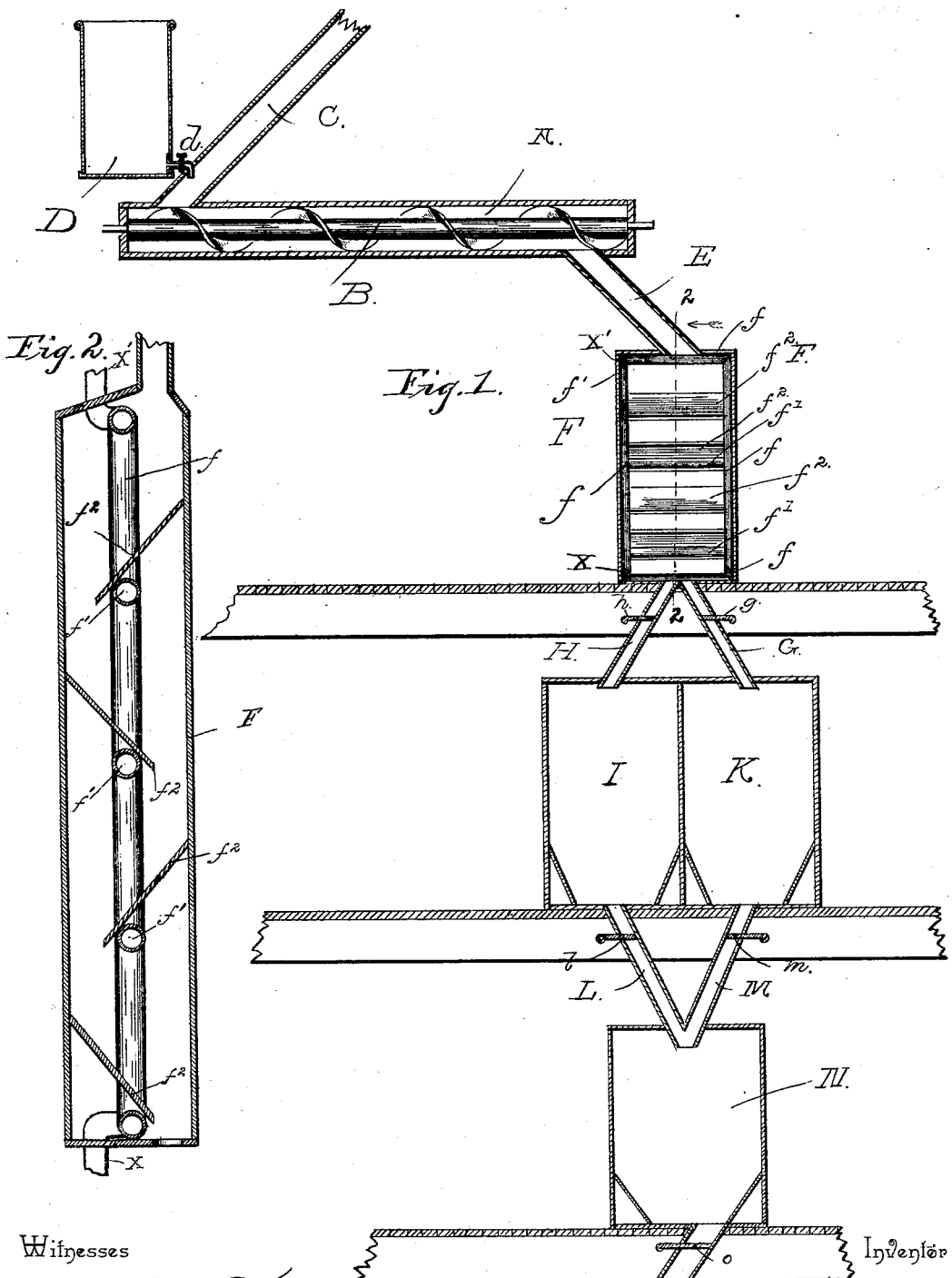

CHARLES O. WEBB, OF LONGMONT, COLORADO.

PROCESS OF AND APPARATUS FOR TREATING WHEAT.

SPECIFICATION forming part of Letters Patent No. 482,068, dated September 6, 1892.

Application filed July 30, 1891. Serial No. 401,204. (No model.)

*To all whom it may concern:*

Be it known that I, CHARLES O. WEBB, a citizen of the United States, residing at Longmont, in the county of Boulder and State of Colorado, have invented a new and useful Process of and Apparatus for Treating Wheat, of which the following is a specification.

My invention relates to improvements in apparatus and processes for preparing wheat before submitting the same to the grinding-rolls; and the object is to crystallize the starch of the wheat-berry and separate the bran from the albumen and the germ and to draw the color from the kernel and impregnate the bran with the same, and thus produce a kernel which when crushed and rolled makes a fine and clean grade of flour.

To attain these ends, the invention consists in treating the wheat with a solution of soda and submitting the same to successive steps of treatment during its wet condition in suitable apparatus, all of which will be hereinafter more fully described, illustrated, and specifically pointed out in the appended claims.

In the accompanying drawings, Figure 1 is a vertical longitudinal sectional view of an apparatus for preparing wheat, which embodies the features of my invention. Fig. 2 is a vertical transverse sectional view of the penetrator or heater on the line 2 2 of Fig. 1.

Referring to the accompanying drawings, A designates a cylinder located at the top of a suitably-constructed building designed for the purposes, and is provided with the ordinary screw conveyer B. Communicating with one end of said conveyer is the inlet spout or trough C, which conducts the wheat to be prepared for grinding within said conveyer, and communicating with said inlet-spout and the interior of the cylinder A is the solution-tank D, provided with an ordinary outlet-spout $d$. As the wheat passes from the spout or trough C into the conveyer, the same is thoroughly saturated with the solution from the tank, said solution being composed of an aqueous solution of soda, which is of the requisite strength to suit the quality of the wheat, and the object of which is to cause the separations described in the objects of the invention herein stated, the strength of the solution being varied according to the nature of the berry can hardly be definitely given, but is under ordinary conditions at the strength of about from two to four ounces of soda to one gallon of water. Passing from the opposite end of the conveyer A, the wet wheat falls through the tube or spout E into the steam penetrator or heater F. The heater or penetrator F incloses a rectangular frame of connected piping $f$ and a series of intermediate imperforate horizontally-arranged parallel pipes $f'$, connected to and opening into the side pipes of said piping-frame, and through all of which pipes a circulation of steam is maintained from the steam supply and discharge pipes $x$ and $x'$, entering the heater and connected to the piping-frame within the same, as clearly illustrated in Fig. 2 of the drawings. Over each of the cross-pipes $f'$ and arranged from alternate sides of the heater are deflecting-plates $f^2$, over which the wet wheat in its passage through the heater is caused to pass in a zigzag course, the effect of the circulating steam being to heat the wheat-berry to such a degree, successively as it passes over the several deflecting-plates, as to cause the same to be more thoroughly impregnated with the solution with which it is originally saturated, causing the said solution to penetrate within the kernel and to hasten the crystallizations of the starch to be separated from the kernel and smut. By submitting the wheat to these steps the object or main idea is to crystallize out the starch, so it will grind into small particles, and the effect and tendency of the same upon the bran and germ is, as stated, to draw out the color from the inside of the kernel to the bran, and thus permitting the inside of the kernel to crystallize and have a finer color. After traveling through the steam penetrator or heater F the wheat next passes through the chutes G and H, the openings in which are controlled by the sliding cut-offs $h$ and $g$, respectively, and into the bins I and K, in which bins the wheat is allowed to remain for a period of about twelve hours, in order that the crystallizations and separations may have sufficient time to take place. From these bins the wheat at this stage of the process is next conducted through the chutes L and M, having the sliding cut-offs $l$ and $m$, respectively, into the third bin N, in which the wheat is allowed to remain about the same period of time as in the other bins. The whole object of moving the wheat from bin to bin and allowing it to remain therein is to have the wheat under control while undergoing the separations, and also to prevent overheating or souring. After the wheat has remained the requisite time in the last bin it is then conducted through the chute O, having the sliding cut-off o, to the ordinary cleaning-brush, and finally to a bin or hopper over the ordinary breaking or grinding rolls to which the wheat is to be fed to be pulverized.

It is thought that the operation of my process and apparatus are now quite apparent. The wheat-berry being first saturated with a solution of soda to effect the separations aforementioned, is then submitted to succeeding subsequent operations or stages in which the said separations have time to be effected and completed, all of which has been herein carefully set forth, and the whole time from the inception of the wheat into the apparatus to its exit therefrom to the ordinary grinding-rolls is designed to be about thirty-six hours, which in view of the apparatus and manner of treatment employed is deemed sufficient for the purposes set forth.

Having thus described my invention, what I claim, and desire to secure by Letters Patent, is—

1. A process for preparing wheat before grinding, which consists in first dampening the wheat-berry in an aqueous solution of soda, passing the soda-dampened or wet berry tortuously through a steam-heated chamber to subject the same to the action of steam-heat and cause a penetration of the soda into the berry, and finally successively passing it into and allowing it to remain within a series of bins, substantially as set forth.

2. In an apparatus for preparing wheat, the combination, with a screw conveyer and a solution-containing tank located at one end thereof, of a steam heater or penetrator connected with the opposite end of said conveyer and provided with a rectangular steam-circulating frame of connected piping, a series of parallel horizontal circulating-pipes communicating with the sides of said rectangular frame of piping, and a series of alternately and diagonally arranged deflecting-plates located over said parallel pipes within the sides of the rectangular pipe-frame, and a series of communicating bins provided with valved openings and connected in series with said heater or penetrator, substantially as set forth.

In testimony that I claim the foregoing as my own I have hereto affixed my signature in presence of two witnesses.

CHARLES O. WEBB.

Witnesses:
DANIEL RANSOM,
GEO. E. SMITH.